United States Patent
Lin et al.

(10) Patent No.: US 8,647,513 B2
(45) Date of Patent: Feb. 11, 2014

(54) METHOD FOR COLLECTING OIL WITH MODIFIED CLAY

(75) Inventors: Jiang-Jen Lin, Taipei (TW); Ru-Siou Hsu, Taipei (TW)

(73) Assignee: National Taiwan University, Taipei (TW)

( * ) Notice: Subject to any disclaimer, the term of this patent is extended or adjusted under 35 U.S.C. 154(b) by 322 days.

(21) Appl. No.: 13/039,335

(22) Filed: Mar. 3, 2011

(65) Prior Publication Data

US 2012/0031846 A1 Feb. 9, 2012

(30) Foreign Application Priority Data

Aug. 4, 2010 (TW) .............................. 99125972 A

(51) Int. Cl.
*C02F 1/28* (2006.01)
(52) U.S. Cl.
USPC ........................... 210/680; 210/691; 210/924

(58) Field of Classification Search
CPC .............................. C02F 1/288; E02B 15/101
USPC ................ 210/680, 690, 691, 692, 693, 924; 502/62, 401; 134/6; 524/445, 450
See application file for complete search history.

(56) References Cited

U.S. PATENT DOCUMENTS 5,558,777 A * 9/1996 Kemnetz et al. .............. 210/691
5,866,645 A * 2/1999 Pinnavaia et al. ............. 524/443

* cited by examiner

*Primary Examiner* — Matthew O Savage
(74) *Attorney, Agent, or Firm* — Pai Patent & Trademark Law Firm; Chao-Chang David Pai

(57) ABSTRACT

The present invention provides a method for collecting oil with a modified clay. By mixing the modified clay and oil, the oil can be adsorbed to the clay. The modified clay is obtained by intercalating a hydrophobic polymer such as acidified poly(oxyalkylene)-amine into layered silicate clay, mica or talc to enlarge the interlayer space. The modified clay thus becomes hydrophobic and adsorption to the oil is promoted.

3 Claims, 6 Drawing Sheets

METHOD FOR COLLECTING OIL WITH MODIFIED CLAY

BACKGROUND OF THE INVENTION

1. Field of the Invention

The present invention relates to a method for collecting oil, and particularly to a method for collecting oil with modified clay, which can be applied to oil pollution remedies or secondary oil recovery.

2. Related Prior Arts

Off-shore drilling and sea transportation of crude oil bring about huge economic interest. However, oil pollutions including waste oil discharged from ships and leaking from pipes or oil rigs always result in environmental disasters.

To solve the above problems, chemical oil adsorbent or dispersants are usually applied and then accompanied with biological agents to degrade oil. However, these methods always cost very high and the procedures are complex.

The present invention therefore provides a simple method for collecting oil by effectively adsorbing oil with a relatively cheap adsorbent.

SUMMARY OF THE INVENTION

The object of the present invention is to provide a method for collecting oil.

To achieve the above object, the oil are mixed with a modified clay and then adsorbed by the modified clay. The modified clay is clay intercalated with a hydrophobic polymeric chemical. The clay can be layered silicate clay, mica or talc having a cation exchange capacity (CEC) ranging from 50 meq/100 g to 200 meq/100 g.

Natural inorganic clay is a rich resource on the earth and usually has a layered structure of silicate. Each silicate layer is about 1 nm thick and the interlayer space is about 12.4 Å. If surface properties of the silicate layers can be effectively modified to make the clay more compatible with organic molecules, the clay could be used for adsorbing oil.

The silicate clay also has a high aspect ratio (about 1×100×100 nm). By intercalating the clay with polymeric chemicals at different CEE (cation exchange equivalent) ratio, the interlayer space of the clay can be increased. The modified clay then becomes hydrophobic and has a larger density of the layer space so that the oil can be effectively adsorbed therein.

The above polymeric chemical can be acidified poly(oxyalkylene)-amine, wherein the oxyalkylene segments can be one or both of hydrophobic oxypropylene (PO-) segments and hydrophilic oxyethylene (EO-) segments. After being acidified, poly(oxyalkylene)-amine is transformed into a quaternary ammonium salt and both of the PO-segments and EO-segments are water soluble and compatible with silicate clay.

In the present invention, the poly(oxyalkylene)-amine usually has a molecular weight ranging from 50 g/mol to 10,000 g/mol, preferably from 400 to 5,000 g/mol, and more preferably from 1,000 g/mol to 4,000 g/mol. Poly(oxyalkylene)-amine preferably has an segment ratio (EO/PO) ranging from 0 to 0.1, and the number of PO-segments is preferably from 13 to 80. Examples of poly(oxyalkylene)-amine include poly(oxyethylene)-monoamine, poly(oxypropylene)-monoamine, poly(oxyethylenepropylene)-monoamine, poly(oxyethylene)-diamine, poly(oxypropylene)-diamine, poly(oxyethylenepropylene)-diamine, poly(oxyethylene)-triamine, poly(oxypropylene)-triamine, and poly(oxyethylenepropylene)-triamine.

In the present invention, the oil can be crude oil, oily drug or other oily materials and the clay is preferably montmorillonite. The modified clay preferably has an interlayer space ranging from 28 Å to 92 Å.

The CEE ratio of poly(oxyalkylene)-amine to the modified clay is preferably ranging from 0.25 to 1.0, and more preferably from 0.3 to 0.6.

DETAILED DESCRIPTION OF THE PREFERRED EMBODIMENTS

The materials used in the preferred embodiments of the present invention include:

1. $Na^+$-montmorillonite: $Na^+$-MMT, having cation exchange capacity (CEC) of about 1.2 meq/g, product of Nanocor Ind. Co.

Figure 1A:
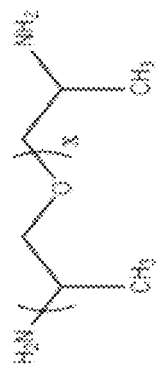
FIG. 1A shows the structure of $Na^+$-montmorillonite ($Na^+$-MMT).
Figure 1A:
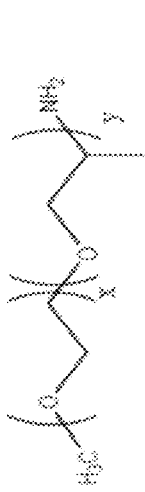
Figure 1B:
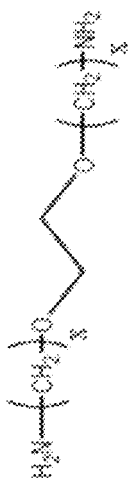
FIG. 1B shows the structure of $Na^+$-montmorillonite ($Na^+$-MMT).
Figure 1B:
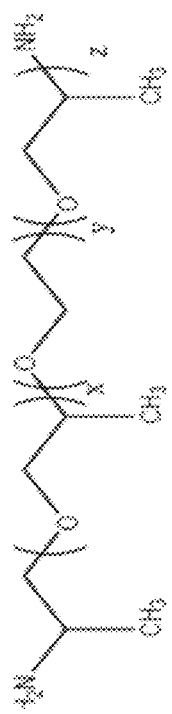
Figure 1C:
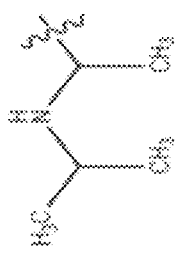
FIG. 1C shows the structure of $Na^+$-montmorillonite ($Na^+$-MMT).
Figure 1C:
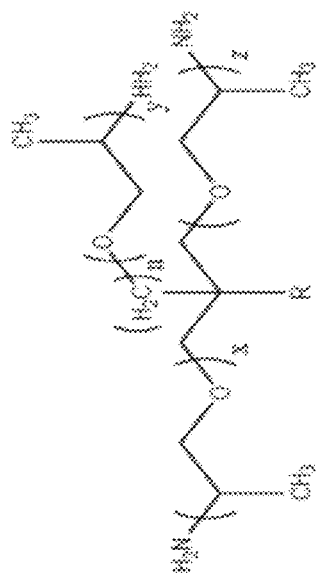

2. Poly(oxyalkylene)-amine of JEFFAMINE® series: Products of Huntsman, as shown in FIG. 1A, FIG. 1B, FIG. 1C, for example, D-2000, D-4000, M-2070 and M-2005.

3. Poly(oxyalkylene)-amine of SURFONAMINE® series: Products of Huntsman, for example, B-100 (a hydrophobic monoamine, a PO-derivative chemical of nonylphenol, having a molecular weight of about 1,000).

4. Crude oil: Purchased from CPC Corporation, Taiwan.

Example 1.1

1. Intercalating of Clay (a) MMT (5 g) was dispersed and swollen in deionized water (500 g) at 80° C. for three hours to prepare a stable and uniform dispersion.

(b) D-2000 (3 g) was added to deionized water (10 g) and then acidified with HCl (35 wt %; 0.16 g).

Figure 2:
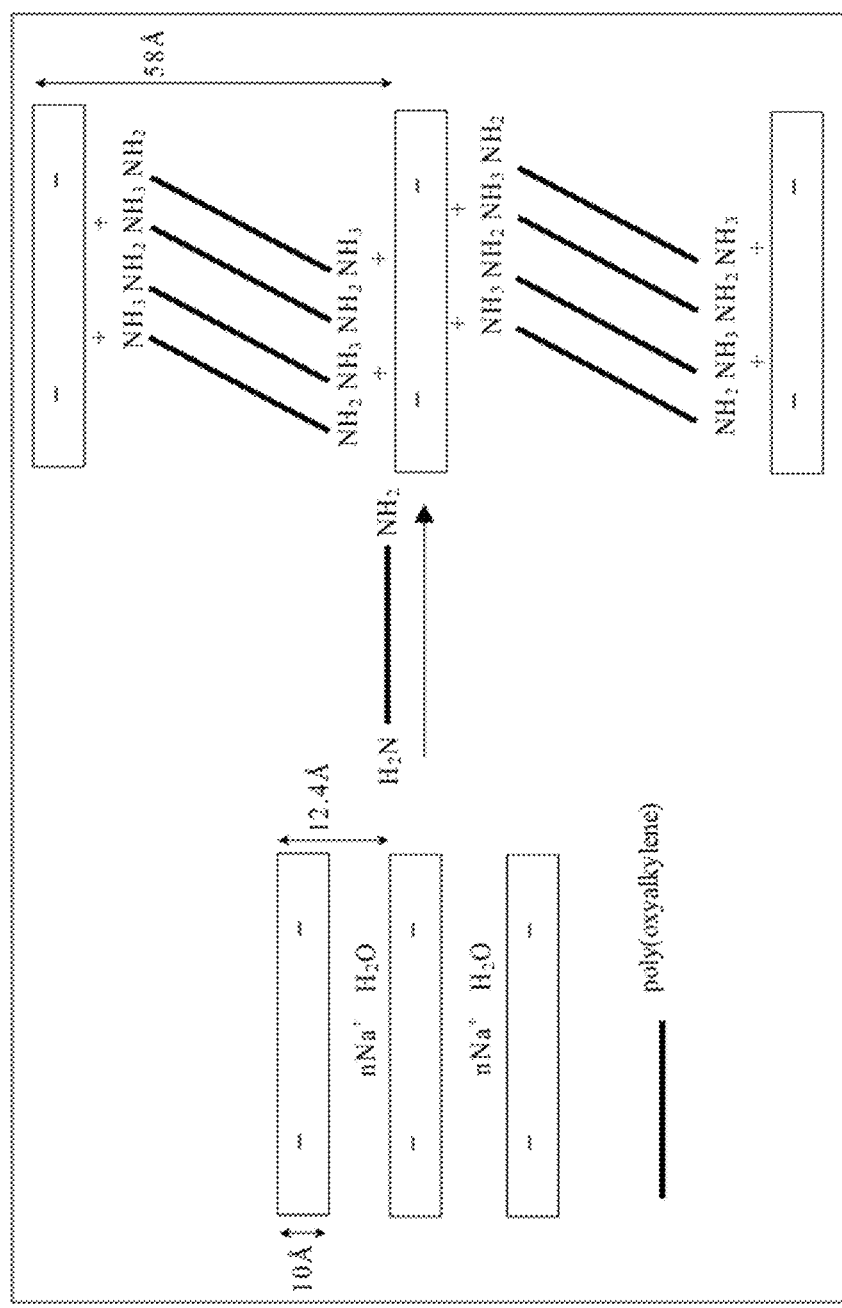
FIG. 2 shows the layered clay modified with poly(oxyalkylene)-diamine.

(c) The acidified D-2000 was added into the MMT dispersion to perform intercalation by continuously mixing at 80° C. for five hours. FIG. 2 shows the layered clay modified with poly(oxyalkylene)-diamine.

(d) After the reaction was completed, the intercalated clay (D-2000/MMT) was collected through filtration to serve as an adsorbent of crude oil. The cation exchange equivalent (CEE) ratio of D-2000/MMT was 0.25. The CEE ratio was determined as follows:

$$CEC(MMT) = 1.2 \text{ meq/g}$$

$$CEC(D\text{-}2000) = 0.5 \text{ meq/g}$$

$$\text{CEE ratio of } D\text{-}2000/MMT = (3 \text{ g} \times 0.5 \text{ meq/g})/(5 \text{ g} \times 1.2 \text{ meq/g}) = 0.25$$

2. Adsorbing Crude Oil (e) D-2000/MMT (2.5 g) was dissolved in water at 5° C. to give a D-2000/MMT dispersion (2 wt %) as D-2000/MMT has a property of lower critical solubility temperature (LCST).

(f) The D-2000/MMT dispersion (25 g) was placed in a 100 ml beaker with a magnetic stirrer, and then crude oil was dropped therein with stirring at low temperature. The weight ratio of crude oil/adsorbent was shown in TABLE 1 below.

TABLE 1

| Example/<br>Comparative Example | poly(oxyalkylene)-<br>amine<br>(EO/PO) | CEC<br>ratio | Organic<br>fraction (wt %) | | adsorption<br>ratio$^c$ (w/w) | | Interlayer<br>space (Å) | |
|---|---|---|---|---|---|---|---|---|
| | | | CEC$^a$ | TGA$^b$ | crude oil/<br>adsorbent | crude oil/<br>MMT | Before<br>adsorption | After<br>adsorption |
| Example 1.1 | D2000 (PO = 33) | 0.25 | 38 | 36 | 6 | 9 | 17 | 17 |
| Example 1.2 | | 0.42 | 50 | 50 | 4 | 8 | 45 | 51 |
| Example 1.3 | | | | | 6 | 12 | | |
| Example 1.4 | | | | | 10 | 20 | | |
| Example 1.5 | | | | | 12 | 24 | | |
| Example 1.6 | | 1.0 | 71 | 70 | 4 | 13 | 52 | 54 |
| Example 2.1 | D4000 (PO = 68) | 0.25 | 55 | 53 | 6 | 13 | 17 | 17 |
| Example 2.2 | | 0.42 | 67 | 66 | 2 | 6 | 88 | 95 |
| Example 2.3 | | | | | 4 | 12 | | |
| Example 2.4 | | | | | 6 | 18 | | 96 |
| Example 2.5 | | 1.0 | 83 | 79 | 2 | 10 | 98 | 100 |
| Example 3.1 | B100 (PO = 13.5) | 0.42 | 33 | 32 | 4 | 6 | 18 | 18 |
| Example 3.2 | | | | | 6 | 9 | | |
| Example 3.3 | | 1.0 | 55 | 52 | 6 | 13 | 48 | 61 |
| Example 3.4 | | | | | 10 | 21 | | |
| Comparative Example 1.1 | M2005 (6/29) | 0.42 | 50 | 48 | 5 | 11 | 18 | 18 |
| Comparative Example 1.2 | | | | | 6 | 12 | | |
| Comparative Example 1.3 | | 1.0 | 71 | 69 | 4 | 13 | 74 | 80 |
| Comparative Example 2 | M2070 (31/10) | 1.0 | 71 | 34 | <1 | <1 | 18 | 18 |
| Comparative Example 3 | none | — | — | 0 | — | <1 | 12 | 12 |

$^a$According to CEC (= 1.2 meq. × molecular weight)
$^b$According to thermogravimetric analysis (TGA), the degradedinorganic (4 wt %) was deleted (degradation temperature 600° C.)
$^c$According to mass balance (g) The mixture was stirred in an ice bath for 30 minutes.

Figure 4:
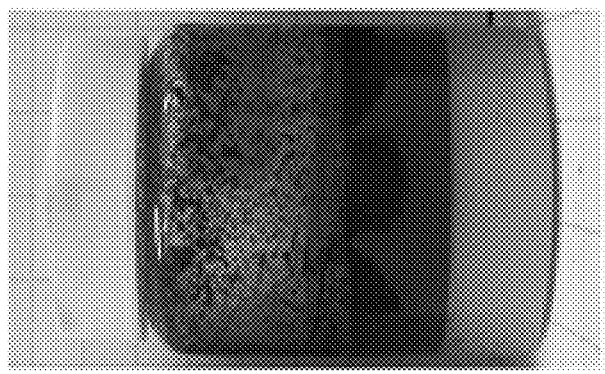
FIG. 4 shows three samples having different effects of adsorbing crude oil.
Figure 4:
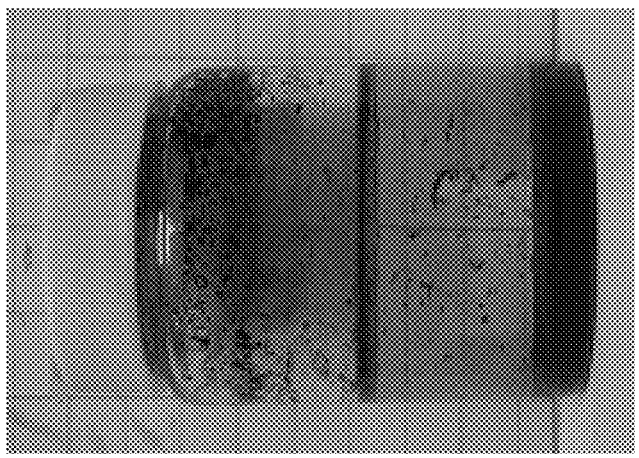
Figure 4:
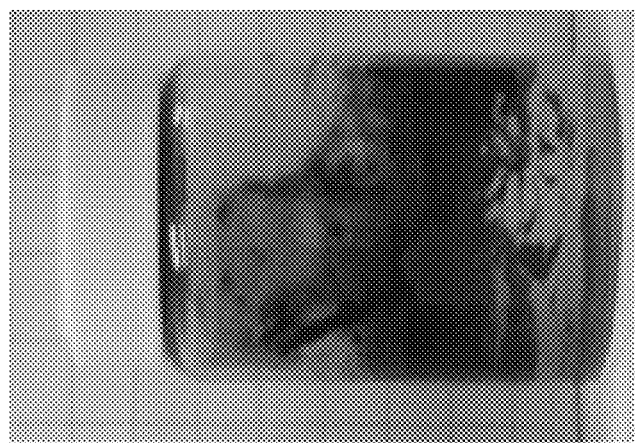

(h) The mixture was further stirred at room temperature for 30 minutes and then allowed to settle. The crude oil adsorbed by the clay was measured. FIG. 4 shows three typical statuses for judging the effects of adsorbing crude oil. Picture (1) indicated good performance as no crude oil adhered on the bottle wall after shaking the sample. Picture (2) indicated poor performance as the crude oil adhered on the bottle wall and could not be separated therefrom after shaking the sample. Picture (3) also indicated poor performance as excess crude oil resulted in adhering of the crude oil to the bottle water.

Examples 1.2-1.5

The steps of Example 1.1 were repeated, except that in step (b), 5 g of D-2000 was added and 0.25 g of HCl was used for acidification. As a result, the CEE ratio of the adsorbent (D-2000/MMT) was 0.42. In step (f), crude oil was added according to the weight ratios of crude oil/adsorbent listed in TABLE 1.

Example 1.6

The steps of Example 1.1 were repeated, except that in step (b), 6 g of D-2000 was added and 0.625 g of HCl was used for acidification. As a result, the CEE ratio of the adsorbent (D-2000/MMT) was 1.0. In step (f), crude oil was added according to the weight ratio of crude oil/adsorbent listed in TABLE 1.

Examples 2.1-2.5

The steps of Example 1.1 were repeated, except that in step (b), D-2000 was replaced with D-4000, and the amounts thereof added were 24 g, 10 g, 10 g, 10 g and 6 g, respectively, and the amounts of HCl used were 0.625 g, 0.25 g, 0.25 g, 0.25 g, and 0.16 g, respectively. Then CEE ratios of the adsorbent D-4000/MMT were respectively 1.0, 0.42, 0.42, 0.42 and 0.25. In step (f), crude oil was added according to the weight ratios of crude oil/adsorbent listed in TABLE 1.

Examples 3.1-3.4

The steps of Example 1.1 were repeated, except that in step (b), D-2000 was replaced with B-100, and the amounts thereof added were 6.0 g, 6.0 g, 2.5 g and 2.5 g, respectively, and the amounts of HCl used were 0.625 g, 0.625 g, 0.25 g and 0.25 g, respectively. Then CEE ratios of the adsorbent B-100/MMT were respectively 1.0, 1.0, 0.42 and 0.42. In step (f), crude oil was added according to the weight ratios of crude oil/adsorbent listed in TABLE 1.

Comparative Examples 1.1-1.3

The steps of Example 1.1 were repeated, except that in step (b), D-2000 was replaced with M-2005, and the amounts thereof added were 12 g, 12 g and 5 g, respectively, and the amounts of HCl used were 0.625 g, 0.625 g and 0.25 g, respectively. Then CEE ratios of the adsorbent M-2005/MMT were respectively 1.0, 1.0 and 0.42. In step (f), crude oil was added according to the weight ratios of crude oil/adsorbent listed in TABLE 1.

Comparative Example 2

The steps of Example 1.1 were repeated, except that in step (b), D-2000 was replaced with M-2070, and the amount thereof added was 12 g, and the amount of HCl used was 0.625 g. Then CEE ratio of the adsorbent M-2070/MMT was 1.0. In step (f), crude oil was added according to the weight ratio of crude oil/adsorbent listed in TABLE 1.

Comparative Example 3

The steps of Example 1.1 were repeated, except that step (b) was skipped to use MMT as the adsorbent. In step (f), crude oil was added according to the weight ratio of crude oil/adsorbent listed in TABLE 1. TABLE 1 also shows the effects of the above Examples and Comparative Examples.

For Comparative Example 2, M-2070/MMT did not perform as well as Examples. The reason was that M-2070 was hydrophilic and could not transform the hydrophilic clay into hydrophobic clay, so that the polymers between the layers could not effectively provide a hydrophobic phase to adsorb crude oil into the layers. As a result, the crude oil dispersed in water and could not be aggregated.

For Comparative Example 3, unmodified MMT was hydrophilic clay and could adsorb crude oil on surfaces thereof but could not effectively attract the crude oil into the layers of clay. Therefore, its effect was not good, either.

Figure 3:
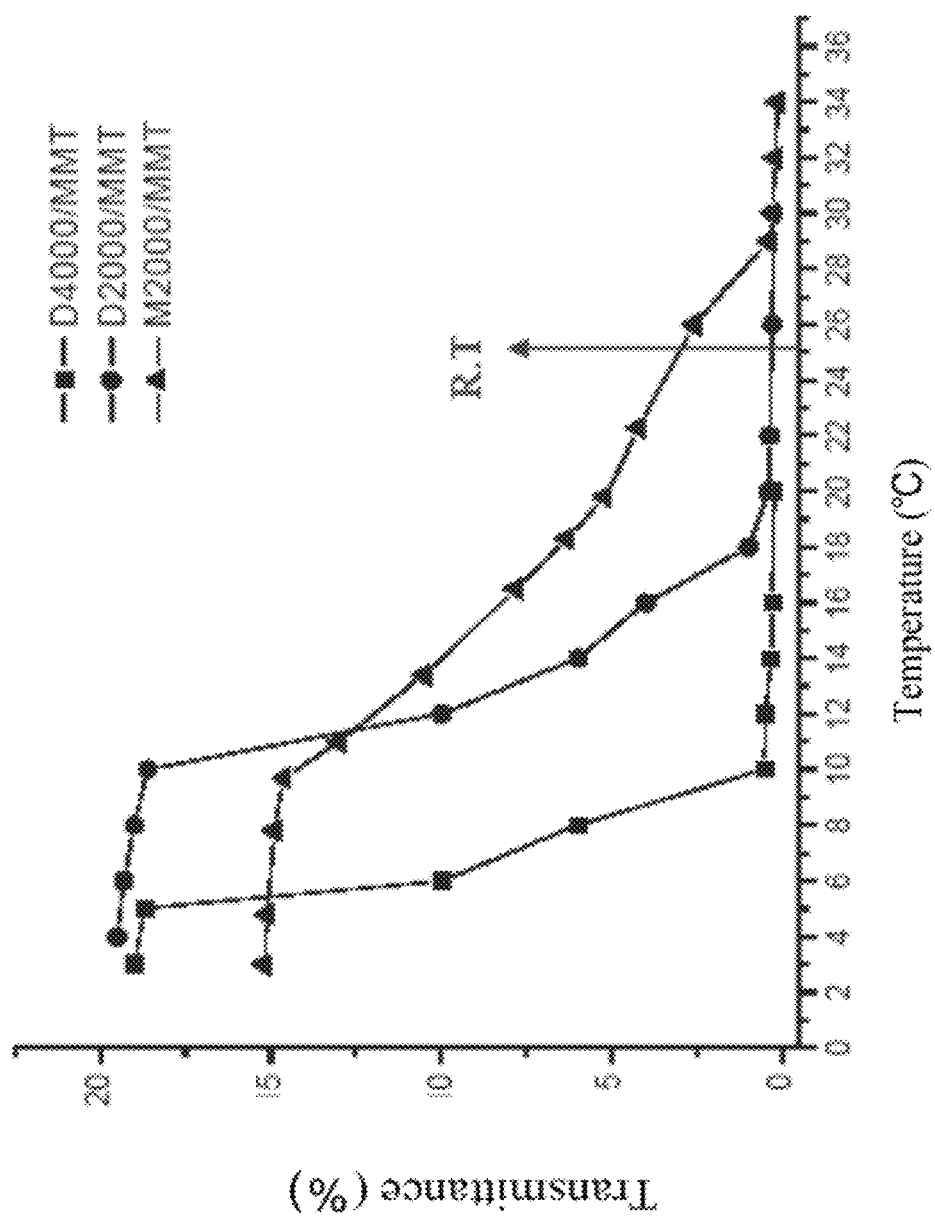
FIG. 3 shows the LCAT (Lower Critical Aggregation Temperature) ranges of Examples 1.6, 2.5 and Comparative Example 1.3.

For Comparative Example 1.3, though M-2005/MMT (1.0 CEC) was hydrophobic, the adsorption effect thereof was not good. The reason was that M-2005/MMT had a LCAT (Lower Critical Aggregation Temperature) around room temperature. That is, at about 25° C., with similar ratios of organic/inorganic, M-2005/MMT (1.0 CEE) could not adsorb crude oil as well as D-2000/MMT (1.0 CEC). FIG. 3 showed the ranges of LCAT for Examples 1.6 and 2.5 and Comparative Example 1.3.

For D-2000/MMT (0.25 CEC), crude oil was not effectively adsorbed when the weight ratio of crude oil/MMT was 9. The reason was that the polymers between layers did not provide enough hydrophobicity at such CEE ratio. B-100/MMT (0.42 CEC) was the same.

TABLE 2 below shows the saturated adsorption ratio of the adsorbents to oil.

TABLE 2

| Example/Comparative Example | Poly(oxyalkylene)-amine | Saturated adsorption ratio (crude oil/adsorbent, w/w) | | |
|---|---|---|---|---|
| | | 0.25 CEC | 0.42 CEC | 1.0 CEC |
| Examples 1.1-1.6 | D2000 | <6 | 10~12 | <4 |
| Examples 2.1-2.5 | D4000 | <6 | 4~6 | <2 |
| Examples 3.1-3.4 | B100 | — | 4~6 | 6~10 |
| Comparative Example 1.1-1.3 | M2005 | — | 5~6 | <4 |
| Comparative Example 2 | M2070 | — | — | <1 |
| Comparative Example 3 | None | — | — | — |

As micelles, the modified clay could gather with each other to become a larger mass. Within the mass, the crude oil was not only attracted between the clay layers but also embedded by the clay.

To understand the mechanism of adsorption of crude oil by clay at different CEE ratios, the modified clay (D-2000/MMT, the weight ratio of crude oil/modified clay=4/1) was exemplified as follows:

(1) For 0 CEE (unmodified clay), crude oil could not be adsorbed at all.

(2) For 0.25 CEE (polymer/clay), crude oil could not be effectively adsorbed as there was not enough hydrophobic polymer in the clay.

(3) For 0.42 CEE (polymer/clay), the clay was hydrophobic enough to effectively adsorb crude oil into the layers thereof and oil was embedded within the clay; i.e., the effect was the best.

(4) For 1.0 CEE (polymer/clay), too much polymer between the layers of clay (i.e., the density of the layer space increased) so that crude oil could not easily enter into the layer space to be effectively embedded, but was adsorbed only on the surfaces of the clay. The effect was therefore not as good as when CEE is 0.42.

For the modified clay (D-2000/MMT, 0.42 CEE) at room temperature, crude oil was added in different weight ratio of crude oil/modified clay at 4, 6, 10 and 12. When more crude oil was adsorbed and embedded by the modified clay, the integral density would decrease. Therefore, the mixture of oil and the modified clay gradually floated up from the bottom.

In addition, compared to D-4000/MMT (0.25 CEE) with an interlayer space of 17 Å, D-2000/MMT (0.42 CEE) with an interlayer space of 45 Å performed better because of its larger space for accommodating or holding more oil though they were similar in organic contents and hydrophobicity.

Dispersing Ability of the Modified Clay at Low Temperature

B-100/MMT (1.0 CEE) and D-2000/MMT (0.42 CEE) were similar in organic contents, hydrophobicity and interlayer spaces. However, D-2000/MMT performed better because it could be better dispersed at low temperature.

The present invention provides a method for recovering oil more effectively than the traditional methods. For example, the weight ratio (crude oil/MMT) could reach up to 20 when D-2000/MMT (0.42 CEE) was applied. Moreover, the mixture of oil and clay could be easily removed from seas after its use.

What is claimed is:

1. A method for collecting crude oil with modified clay, comprising:
   providing a clay and a poly(oxypropylene)-diamine having a molecular weight of about 2,000 g/mol;
   acidifying the poly(oxypropylene)-diamine with an acid to obtain acidified poly(oxypropylene)-diamine;
   intercalating the clay with the acidified poly(oxypropylene)-diamine to obtain a modified clay, wherein the ratio of the cation exchange equivalents (CEE) of the poly(oxypropylene)-diamine to the clay is about 0.42; and
   mixing a mixture containing water and crude oil with the modified clay,
   wherein the clay is montmorillonite (MMT) having a cation exchange capacity (CEC) ranging between 50 meq/100 g and 200 meq/100 g.

2. The method of claim 1, wherein the modified clay has an interlayer space of about 45 Å.

3. The method of claim 1, wherein the acid used to acidify the poly(oxyalkylene)-amine comprises HCl.

* * * * *